Aug. 6, 1946.   V. H. PAVLECKA   2,405,164
TURBINE STATOR
Filed March 25, 1941   3 Sheets-Sheet 3

INVENTOR,
VLADIMIR H. PAVLECKA.
BY
Lippincott & Metcalf
ATTORNEYS.

Patented Aug. 6, 1946

2,405,164

UNITED STATES PATENT OFFICE 2,405,164

TURBINE STATOR

Vladimir H. Pavlecka, Pacific Palisades, Calif., assignor to Northrop Aircraft, Inc., Hawthorne, Calif., a corporation of California Application March 25, 1941, Serial No. 385,105

5 Claims. (Cl. 253—78)

This invention relates to turbine stators and particularly to the stators of constant combustion gas turbines, although it is also applicable to gas and steam turbines of other types.

In order to obtain high efficiencies from gas turbines, however, the temperatures of the propulsive gases must be extremely high, in comparison to ordinary turbine practice, in order to obtain the efficiencies of which such devices are theoretically capable and because of the high temperatures and high gas velocities involved in structures of this type one of the primary difficulties in their design is the accommodation of expansion of the parts. In order to prevent waste of power through leakage of gases past the blading the device must be made to close tolerances, and these tolerances should be maintained particularly at operating temperatures as well as when the device is cold. To prevent by-passing of the gases around the blading some form of inter-stage sealing should be used, and the customary expedient in running joints which must be maintained against gas pressures is some form of labyrinth seal. Such seals, however, become useless if the structure is warped out of circularity by temperature stresses. Furthermore, it is impossible to use oil lubrication at the seals at the temperatures involved, and if warpage does occur, so that the parts rub unduly, the frictional losses may become even greater than that due to by-passing.

In order that the device may be assembled with its interleaved rows of rotor and stator blades, it is necessary that the stator be divided on an axial plane, and when the two halves of the stator are clamped together it is difficult to maintain true circularity. The seal between the two halves may be constructed as accurately as possible, but even if all sealing compounds between the joints be dispensed with, and straight metal-to-metal contacts be employed, the mere presence of the necessary clamping flanges is sufficient to cause some temperature inequalities throughout the periphery of the device, resulting in lack of circularity—perhaps only a few thousandths of an inch, but sufficient to cause either undue friction or by-passing, as the case may be.

The broad purpose of the present invention is to overcome the difficulties mentioned, that is, among the objects of the invention are to provide a turbine structure which will maintain the stator blades in truly circular alinement irrespective of slight departures from such circularity in the turbine frame due to failure to achieve exact apposition between the halves thereof; to provide a structure which will likewise maintain circularity of the blading in spite of irregularities in thermal expansion of the frame; to provide a structure which will prevent deformation of the seats for labyrinth seals on the rotor blading; to provide a structure which will permit the use of true labyrinth seals on such blading, rather than reducing such seals to a rudimentary and correspondingly inefficient form; to provide a structure which will permit the necessary longitudinal expansion and contraction of the parts without untoward consequences; to provide a structure wherein the blading is rigidly held and is mutually interlocking but which requires minimum disturbance of metal and consequent minimum weakening and temperature deformation of the parts; and to provide a structure which is simple to construct and assemble.

Considered broadly, the invention comprises the usual turbine stator frame, divided into two halves along its longitudinal axis, with the usual clamping flanges for bolting the two halves together. Within this frame there is formed at least one, and usually a plurality of cylindrical internal seats for holding blade support rings. Where the structure is used in gas turbines a plurality of stages must practically always be used, in which case successive seats for the stage blading form an expanding stepped cone from the intake to the exhaust end of the turbine. Each seat engages a blade support ring which comprises an interior rigid annulus to which the blades are secured and which preferably carries a row of blades on the intake side or end of the ring and a seat for the labyrinth seal on the rotor blading on the exhaust side, although it would, of course, be possible to interchange the position of these two halves. Connected to the rigid annulus which carries the blade is a resilient annulus which engages the seat, with a resilient connection between the two annuli. The amount of resiliency provided need not, and should not be large; actually the outer annulus is merely press-fitted into the seat, the deformation inseparable from such a fit being all that the resilient annulus is ever subjected to, but the actual form of the outer annulus is either a single or, preferably, a pair of cantilever cylindrical flanges which are connected to the blade carrying annulus at or near its median plane, these flanges being relieved toward the median plane and engaging the seat at their outer or cantilever ends so that their deformation will be somewhat greater under the pressure of the fit than that of a solid ring would be. The inner annulus may thus, through its own rigidity, retain its circular form and any deformation or deviation of the frame from circularity is taken up in the resiliency of the flanges and their connections with the inner annulus. The blade support rings are themselves split and their ends dowelled together, and although the friction of the press fit is sufficient in theory to hold the blading in position under all circumstances, it is still preferable to key the outer annulus to the stator at the point of division to prevent any possibility of turning.

In the usual case, i. e., in a multi-stage turbine, the blade carrying flange of each stage abuts the preceding support ring to hold it in position, and there is also preferably provided an annular compression spring interposed between the final support ring and the frame to maintain a contact against the series of rings and prevent any tendency to creep toward the exhaust end under recurring expansions and contractions.

The invention may better be understood by reference to the accompanying drawings, wherein.

Figure 1:
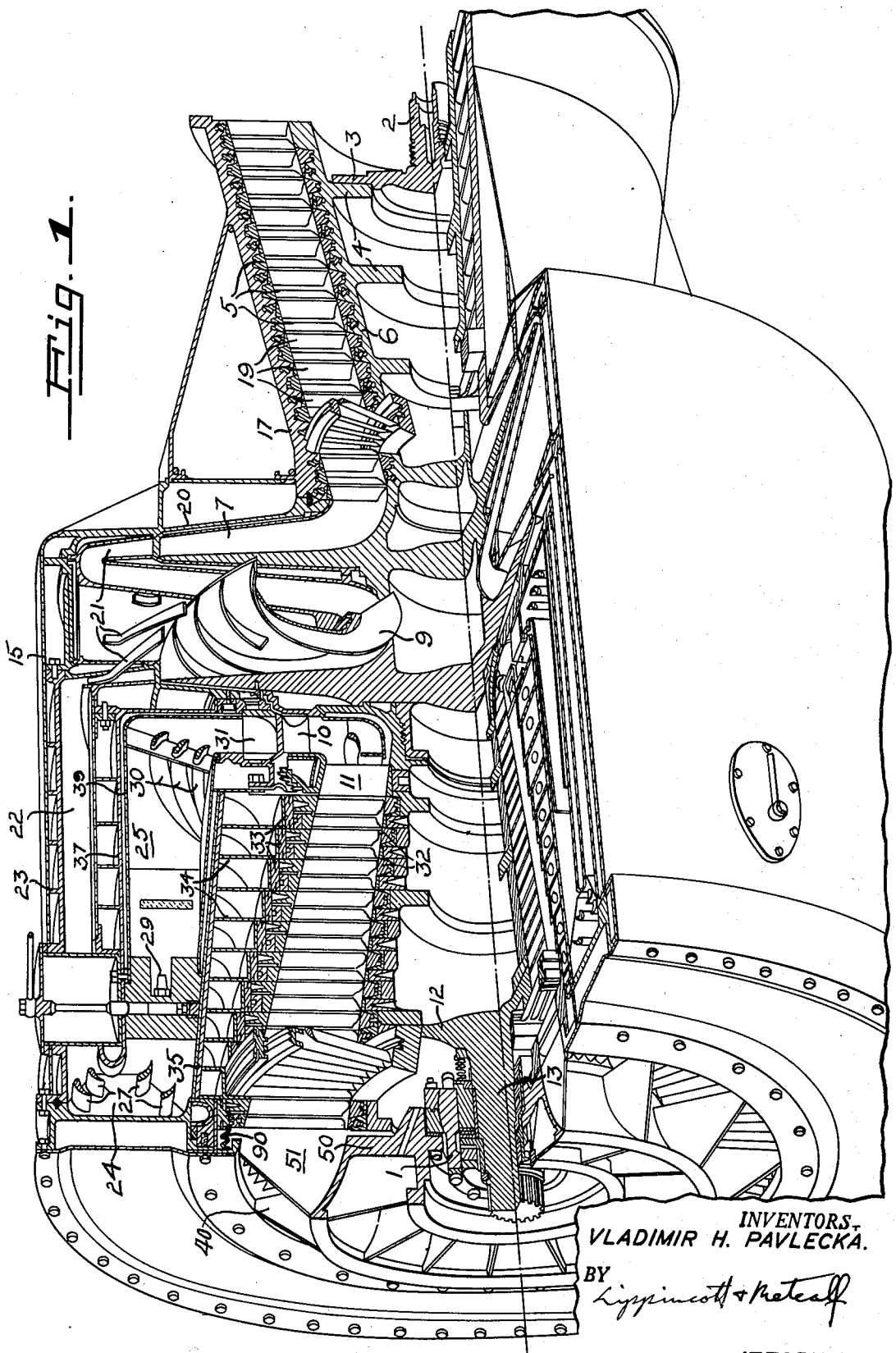
Fig. 1 is a sectionalized perspective view of a constant combustion gas turbine embodying the present invention.

In order to illustrate and explain the present invention I have chosen a type of constant combustion gas turbine such as is more fully shown and described in the copending application, Serial No. 403,338 filed July 21, 1941, by Pavlecka and Northrop and entitled "Gas turbine." Two modifications are shown, as they embody the present invention in slightly variant forms. There are other minor differences between the two, but as each part in one has a substantially corresponding part in the other, the same reference characters are applied to corresponding elements of both.

Turbines of this character comprise first, a compressor for precompressing the air which forms the major portion of the propulsive gases, second, the burner where the gases are heated and the driving energy supplied, and third, the turbine proper where the gases are expanded to deliver the net power output. In the present cases the compressor and the turbine proper are combined into a single unit, having a single moving part or rotor formed as a composite drum supported by two bearings only. Of these bearings the exhaust end bearing 1 is shown in some detail; the intake end bearing is omitted, merely the stub end of the shaft 2 which is journaled therein being shown, and it being understood that the bearing itself is mounted and supported by the frame in the same general manner as is the exhaust end bearing 1.

The stub shaft 2 terminates in a disc 3 which is bolted to the outermost of one of a plurality of interior flanges 4 of the steel rotor drum 6, the periphery of which carries a plurality of stages of turbine type compressor blades 5. Following these blades on the drum are two centrifugal compression stages which are substantially similar in form, the first of these stages 7 being drawn to show the cross-sectional shape of the compressor passages while the second stage 9 shows the shape of the compressor blades, these being carried forward beyond the plane of section in the perspective view in order to illustrate them more fully. Following the final compressor stage the drum carries an inward flow impulse turbine stage 10, which discharges into an axial flow inverted impulse stage 11, after which there follow a plurality of stages of reaction type turbine blades wherein the final expansion of the propulsive gases takes place. This, the exhaust end of the turbine drum, is supported by a disc 12 substantially similar to the disc 3, from which projects a stub shaft 13 carried by the bearing 1. All of the foregoing structure is described only in general terms since it is covered in detail in the copending application above mentioned.

The rotor is surrounded and supported by a composite housing 15 which is divided longitudinally into an upper and lower half. The compressor end 17 of the housing carries the stator blades 19 of the turbo-compressor which merges into the housing 20 of the centrifugal compressor stages. These include diffusers 21, the blading of which is shown only in the second stage. The compressors discharge into an annular passage 22 formed in the frame 23 of the turbine proper. The annular duct 22 is reflexed at the exhaust end, the compressed gases being deflected around a passage 24, connecting the outer duct with an inner annular duct 25, by means of guide vanes 27. A series of burners 29 are uniformly distributed around the inlet of this inner duct. These burners are preferably of the type shown and described in the copending application, Serial No. 381,522 filed March 3, 1941, by Dallenbach and Northrop and entitled "Oil burner." The inner duct 25 thus forms a combustion chamber for the gases and combustion is complete at the inner end of the duct, at which point another set of guide vanes 30 directs the gases radially inward to the expansion nozzle 31 of the inward flow impulse turbine, from which they are discharged axially to the final reaction stages above referred to.

The stator blades 32 of the reaction stages are carried on blade support rings 33 which are mounted in a series of cylindrical seats 57 carried by diaphragms 34 projecting inwardly from the inner portion of the double inner wall 35 of the duct 25. It is this portion of the turbine and particularly of its stator frame that particularly concerns this invention, and this structure can best be seen in Figures 3 or 5 of the drawings. In order to see the reasons for and advantages of the present invention, however, it is believed desirable first to devote some attention to the operation of the turbine itself in order to show the operating conditions which the structure must withstand.

Atmospheric air is drawn into the intake end of the turbo-compressor and given a preliminary compression by the inter-action of the blades 5 and 19, and thence delivered to the two centrifugal compression stages where it receives its final compression. The compressors here shown are high speed devices, operating at approximately 8,000 R. P. M. Compression is nearly adiabatic, there being, of course, some heat added by friction and some lost by radiation before the air is delivered to the duct 22, but the pressure at this point is about six and a half atmospheres and the temperature in the neighborhood of 600 degrees F.

As is shown in the copending application of Dallenbach and Northrop above referred to, only a portion of the air is delivered directly to the burners. A relatively small portion of it passes between adjacent and spaced outer wall portions 37 and 39 of the duct 25, to discharge into the impulse blading 31 without coming into direct contact with the flame and serving to protect the stress-carrying walls of the frame from the maximum heat of the burner. A further portion of the air passes into the duct 25 past the burners and does not mix with the products of combustion until the burning is practically complete. The maximum temperature of the flame is of the order of 3,000 to 3,600 degrees F., but since nearly six times as much air is supplied as is necessary for complete combustion, and since the form of the burner is such as to cause intense turbulence in the region of mixing, the temperature of the gases rapidly becomes uniform and is reduced to about 1,450 degrees F., at which temperature it reaches the nozzles 31 and is immediately cooled, by its expansion in the nozzles, to approximately 1,350 degrees F. Further expansion in the nozzles 10 drops the temperature another 100 degrees, so that where the gases strike the first row of reaction stator blades the temperature is down to about 1,250 degrees F., and further drops in temperature take place through the reaction stages until the gases discharge into atmosphere through the exhaust parts 40.

A consideration of the positions of the parts and the temperatures at these various positions will indicate something of the large gradients involved and the consequent differential expansions and stresses. At the exhaust end the outer portion of the blade supporting frame is approximately at 600 degrees F., while the blading carried by the final stage is exposed to a temperature perhaps 200 degrees higher. The outside of that portion of the frame carrying the first set of reaction blades is at perhaps 900 to 1,000 degrees F., while this set of blades themselves are at nearly 1,200 degrees F.

When the turbine is built and fitted, and between the times when it is in operation, all of the parts are at substantially room temperature. Even with modern alloys the maximum temperatures involved approach the limits at which such materials may be operated, and the expansions involved and the thermal stresses set up are extremely serious. Conventional methods of blade mounting cannot insure maintenance of circularity and consequent non-interference of blades. Such methods of mounting would therefore involve greatly increased clearances between the blades, resulting in lost efficiencies. It is therefore safe to say that a blade mounting which will enable blades to be closely spaced and sealed against by-passing of gases, as provided by this invention, constitutes the difference between a commercially operative and a commercially impractical turbine.

Because of the small size permissible in patent drawings it is impossible to show the detail of the construction in Fig. 1, and hence attention is directed to the following figures in the explanation which follows.

Figure 2:
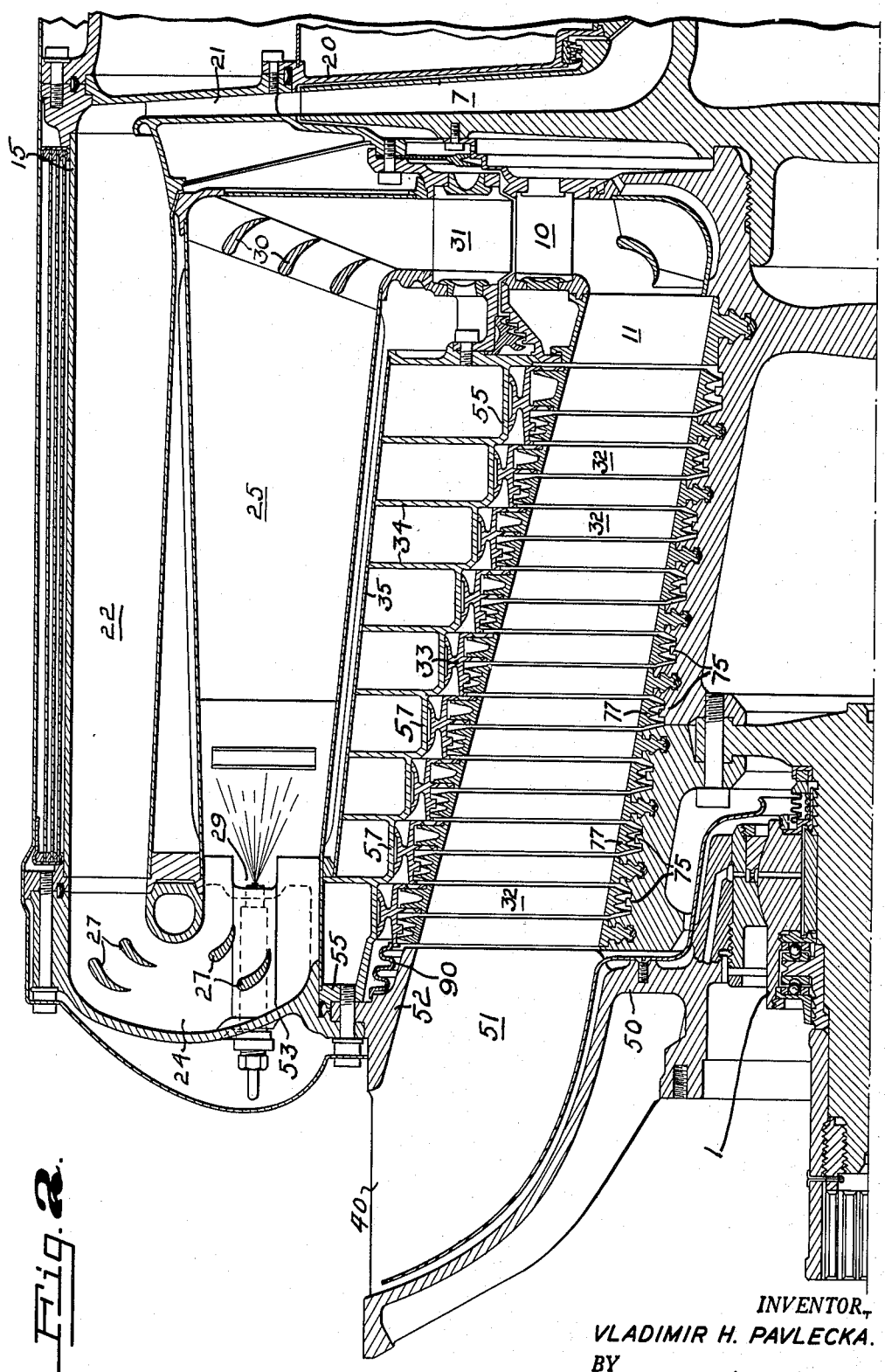
Fig. 2 is a longitudinal sectional view through the driving or turbine proper portion of a turbine substantially similar to that of Fig. 1, but employing blade support rings of slightly modified form.

Turning, then, to Fig. 2, each half of the bearing 1 carries a semi-circular ring 50 connected by vane-like spokes 51 to an outer ring 52 to which is bolted an annulus 53 forming one wall of the connection between the outer duct and the inner duct 25. The blade supporting cone or frame 55 is seated against and bolted to the ring 52.

This cone 55 is preferably machined from austenitic steel, with radially projecting flanges forming the diaphragms 34 which are welded to the wall 35, the inner of the double walls of the combustion chamber or duct 25. The flanges 34 are perforated to permit a certain amount of circulation of air therethrough.

Connecting the flanges 34 are the stepped cylindrical seats 57 for the blading. The finish of the outer surfaces of these seats is not important, but their inner surfaces should be accurately machined to close limits.

Figure 3:
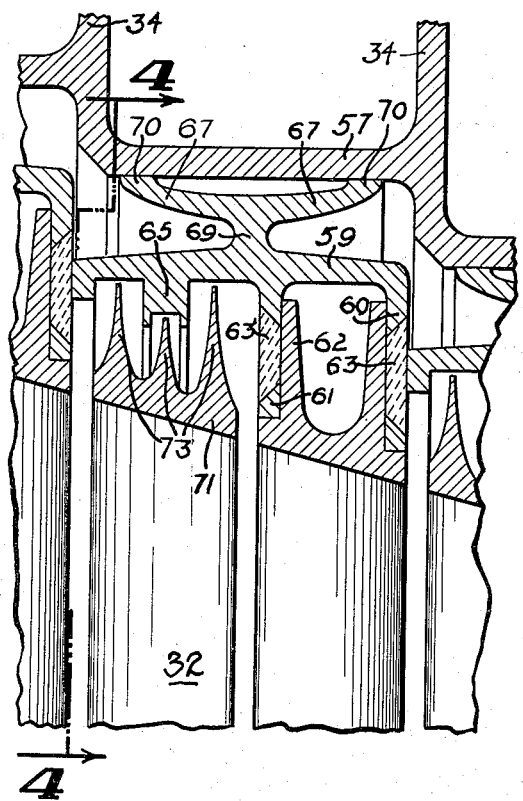
Fig. 3 is a fragmentary view on a larger scale, showing in axial section a blade support ring, as employed in Fig. 2, and portions of its seat and the blades carried by it.

It is within these seats that the blade support rings are pressed. As is shown in Fig. 3, these rings comprise an inner annulus 59 carrying on one side an inwardly opening, U-shaped groove formed between flanges 60 and 61, which lend great rigidity to the inner annulus. The flanges 60 and 61 are pierced at intervals corresponding to the pitch of the blades. Annular sectors 62 which carry the blades 32 are set into the groove or channel formed between the flanges and are welded in place, filling the holes just referred to with welds 63, 63'. After the blades are thus set and secured in place the outer surfaces of the flanges 60 and 61 are accurately machined.

The blade seats occupy but half of each annulus 59. The other half has its inner surface accurately machined to size, a ridge or ring 65 being formed approximately at the center of the open portion.

Figure 5:
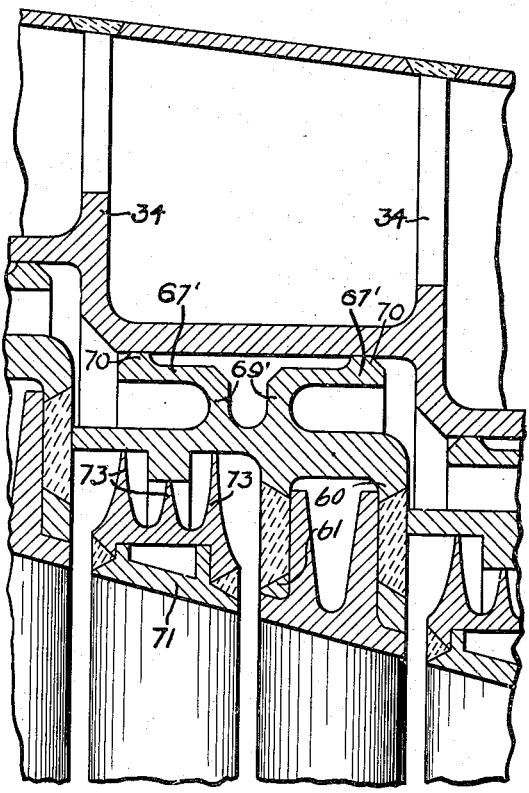
Fig. 5 is a view similar to Fig. 3, showing in detail the type of blade support ring illustrated in Fig. 1.
Figure 4:
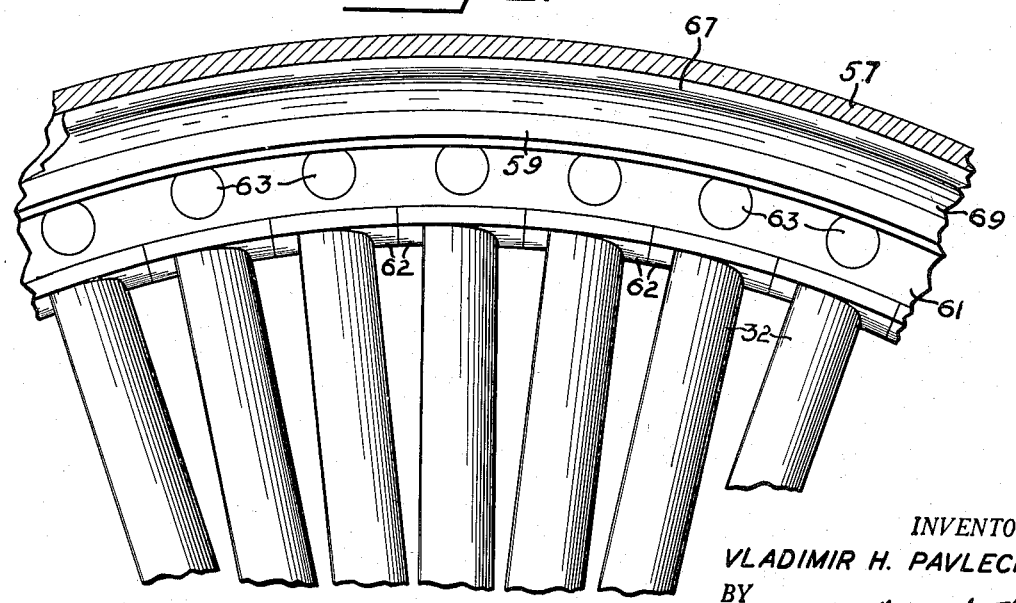
Fig. 4 is also a fragmentary view showing a portion of the blade support ring and the blades, the plane of section being indicated by the line 4—4 of Fig. 3.

The outer annulus of the blade support rings is formed of one or two cantilever flanges. In principle, the two forms shown in Figs. 3 and 5 are identical, but in Fig. 5 the outer annulus comprises two separate flanges 67', each joined to the inner annulus 59 by a separate support 69', whereas in Fig. 3 the two flanges 67' have a common support 69 connected to the inner annulus. In each case, however, the abutments 70 are formed on the outboard edges of the flanges and are machined to a press fit with the seat 57. Therefore, although the outer tips of the flanges are under high compression, the resilient connection between these flanges and the rigid annulus 58 prevents any radial deformation from being communicated to it. Hence not only the row of blades but also the seal seat carried by the inner annulus remain round. The expansion of the inner ring under temperature tends to be greater than the expansion of the seat, since the blades are exposed to the hotter gases, and the result of such expansion is only a slightly greater compression of the spring flanges. Effectively, therefore, it is the size of the blade support ring and its expansion which determines its own position; the expansion and contraction of the frame which carries it cannot affect it materially.

The rotor blades 11 each carry labyrinth seal rings 71 each having three flanges 73 which bear on the seal seat respectively on, and at either side of, the ribs 65. In manufacture these flanges are machined to a tight fit, and before the turbine is placed in operation the rotor is "run in," first cold, and later hot, so that the flanges wear their own grooves into the seat. Similar seal seats 75 and seal rings 77 are carried by the rotor blades, to complete the protection against by-passing.

The flanges 60 of each blade-support ring bear against the annulus 59 of the preceding and smaller ring, tending to support and hold it in place. The last support ring of the series abuts an annular compression spring 90 which bears against the ring 52, and maintains the entire stator blade structure in compression. This spring merely supplies a definite urge to prevent any tendency of the blade-support rings to creep outwardly or toward the exhaust end of the turbine when the device cools after use.

After the turbine has been run into a fit when hot, the effect of contraction on cooling is to provide a slight spacing between the labyrinth seal rings and their respective seats. This is of distinct advantage in that it means that the rotor will run more freely when the device is cold than when it is hot, which contributes to the ease of starting.

I claim:

1. A turbine stator comprising a frame having an interior cylindrical seat formed thereon, a blade support ring press fitted into said seat, a circular row of radial turbine blades mounted on one side of said support ring, and a labyrinth seal seat formed on the other side of said support ring, said support ring having a resilient cantilever flange formed thereon to engage said seat.

2. A turbine stator comprising a frame, a plurality of cylindrical interior seats of progressively increased diameter formed within said frame to form a stepped internal surface, a plurality of blade support rings press-fitted into said seats respectively, and an inwardly projecting row of substantially radial blades mounted on one side of each of said rings, and a labyrinth seal seat formed on the other side of each of said rings, each of said rings including a radially compressible flange bearing against said seat, and each being provided with a side flange abutting the next adjacent support ring to provide additional resistance to the latter against axial thrusts.

3. A turbine stator comprising a frame, a plurality of cylindrical interior seats of progressively increased diameter formed within said frame to form a stepped internal surface, a plurality of blade support rings press-fitted into said seats respectively, an inwardly projecting row of substantially radial blades mounted on each of said rings, each of said rings including a radially compressible flange bearing against said seat, and each being provided with a side flange abutting the next adjacent support ring to provide additional resistance to the latter against axial thrusts, an end disc rigidly secured to said frame, and an annular axially compressible spring mounted between said end disc and the last and largest of said successive support rings to keep the entire series thereof in compression against longitudinal thrusts developed against said blades in operation while permitting thermal expansion.

4. A turbine stator comprising a substantially cylindrical frame divided along its longitudinal axis and having an interior substantially cylindrical seat formed therein, a blade support ring engaging said seat, and inwardly projecting blades mounted on said support ring, said support ring comprising a rigid blade-carrying inner annulus on one side of said support ring, and a rigid labyrinth seal seat on the other side of said support ring to provide a truly circular support for said blades and seat, an outer deformable annulus for engaging said seat, and a resilient connection between said annuli whereby departures from true circularity in said frame are not communicated to said blades or seats.

5. A turbine stator comprising a frame, a plurality of cylindrical interior seats of progressively increased diameter formed within said frame to form a stepped internal surface, a plurality of support rings press-fitted into said seats respectively, and an inwardly projecting row of substantially radial blades mounted on one side of each of said rings, each of said rings including a radially compressible flange bearing against said seat, and each of said rings being provided with a side flange abutting the next adjacent support ring to provide additional resistance to the latter against axial thrusts, and a labyrinth seal seat formed on the inner surface of said side flange.

VLADIMIR H. PAVLECKA.